(12) United States Patent
Miyauchi et al.

(10) Patent No.: US 7,605,982 B2
(45) Date of Patent: Oct. 20, 2009

(54) IMAGE PICKUP SYSTEM

(75) Inventors: Yuji Miyauchi, Machida (JP); Hirohiko Kimata, Hino (JP)

(73) Assignee: Olympus Corporation, Tokyo (JP)

( * ) Notice: Subject to any disclaimer, the term of this patent is extended or adjusted under 35 U.S.C. 154(b) by 474 days.

(21) Appl. No.: 11/495,531

(22) Filed: Jul. 31, 2006

(65) Prior Publication Data

US 2006/0274182 A1 Dec. 7, 2006

Related U.S. Application Data

(62) Division of application No. 11/195,814, filed on Aug. 3, 2005, which is a division of application No. 10/059,029, filed on Jan. 30, 2002, now Pat. No. 6,958,863.

(30) Foreign Application Priority Data

Jan. 30, 2001 (JP) .............................. 2001-021491

(51) Int. Cl.
 *G02B 25/00* (2006.01)
(52) U.S. Cl. ........................ 359/643; 359/646; 359/754
(58) Field of Classification Search .......... 359/643–646
 See application file for complete search history.

(56) References Cited

U.S. PATENT DOCUMENTS

| 5,546,224 | A | 8/1996 | Yokota |
| 5,835,279 | A | 11/1998 | Marshall et al. |
| 5,886,825 | A | 3/1999 | Bietri |
| 6,064,530 | A | 5/2000 | Yano et al. |
| 6,307,685 | B1 | 10/2001 | Mori et al. |
| 6,536,960 | B2 | 3/2003 | Kubo et al. |
| 7,131,735 | B2 * | 11/2006 | Yokoyama .................... 353/98 |
| 2002/0024743 | A1 * | 2/2002 | Endo et al. ................... 359/643 |
| 2008/0048960 | A1 * | 2/2008 | Jacobsen et al. .............. 345/87 |

FOREIGN PATENT DOCUMENTS

| JP | 53-135657 | 11/1978 |
| JP | 60-227215 | 11/1985 |
| JP | 02-110421 | 4/1990 |
| JP | 05-045594 | 2/1993 |
| JP | 05-119274 | 5/1993 |
| JP | 05-181071 | 7/1993 |
| JP | 08-029705 | 2/1996 |
| JP | 08-029706 | 2/1996 |
| JP | 11-160630 | 6/1999 |
| JP | 2000-013652 | 1/2000 |

\* cited by examiner

*Primary Examiner*—Jordan M. Schwartz
(74) *Attorney, Agent, or Firm*—Kenyon & Kenyon LLP

(57) ABSTRACT

The invention relates to an image pickup system comprising an electronic view finder suitable for achieving compactness and having a sufficient viewing angle of field and satisfactory optical performance. The image pickup system comprises an image pickup device, an image display device for displaying an image, a controller for converting image formation obtained from the image pickup device into a signal that enables the image information to be formed on the image display device, and a viewing optical system for guiding an image displayed on the display device to a viewer's eye. The viewing optical system comprises at least three lenses.

8 Claims, 8 Drawing Sheets

IMAGE PICKUP SYSTEM

This is a division of application Ser. No. 11/195,814 filed 3 Aug. 2005, which is a division of application Ser. No. 10/059,029 filed 30 Jan. 2002 now U.S. Pat. No. 6,958,863, the contents of which are incorporated herein by reference.

This application claims the benefit of Japanese Application No. 2001-21491 filed in Japan on Jan. 30, 2001, the contents of which are incorporated by this reference.

BACKGROUND OF THE INVENTION

The present invention relates generally to an image pickup system such as a silver-salt or digital camera, and more particularly to an image pickup system comprising an electronic view finder suitable for use with a compact image display device, especially a reflection type liquid crystal display device.

Most of silver-salt or digital cameras comprise means for recording images picked up by an image pickup optical system and a viewing optical system for checking an image pickup range. For the recording of images, chemistries on film surfaces are used in the case of silver-salt cameras, and information obtained through photoelectric conversion at electronic image pickup devices such as CCDs are employed in the case of digital cameras.

On the other hand, most of viewing optical systems are of the type designed to form an image on the retina of a viewer's eye, thereby viewing the image to be picked up. This type of viewing optical system does or does not comprise an image pickup optical system for forming an image to record a part of the entrance side. A typical example of the former is a single-lens reflex camera, and that of the latter is a real image type finder suitable for use on a zoom optical system, including an objective optical system, an image-erecting means and an eyepiece optical system and now mounted on most products. These are often collectively called an optical finder.

In many cases, digital cameras or video cameras are put on the market while they are provided thereon with an electronic finder designed to display an image on an LCD (liquid crystal display device) rather than an optical finder, so that the image pickup range can be checked by allowing an observer to have a direct view of the image. Digital cameras with both an optical finder and an electronic finder mounted thereon, too, are now commercialized.

Furthermore, the so-called EVF (electronic view finder) designed to view images on LCDs via a viewing optical system is proposed. For conventional commodities with such an electronic finder mounted thereon, there is used a display device with a display screen having a diagonal length of about 0.5 inches or 12 mm.

However, there are growing demands for size reductions of cameras. The associated viewing optical system has been designed in conformity with conventional LCD size; the whole size of the viewing optical system cannot be reduced or some limitations are placed on further size reductions of image pickup systems.

Meanwhile, some LCDs have been developed with size smaller than so far achieved. However, when such LCDs are used with an electronic view finder, existing viewing optical systems offer a problem that the angle of field for viewing subjects becomes small depending on LCD size so that satisfactory observation becomes difficult.

Further, as the whole size of a viewing optical system is reduced in conformity with LCD size, some inconveniences such as failures in obtaining the eye relief necessary for observation are unavoidable.

Furthermore, as the magnification of the viewing optical system increases with decreasing image display device size, not only is chromatic aberration of magnification likely to occur but there is also a problem that dust, etc. deposited on the viewing optical system is visible on an enlarged scale.

To add to this, when a reflection type display device with light rays incident on its display screen side is used as the image display device, it is required to get hold of the separate optical path necessary for display purposes.

SUMMARY OF THE INVENTION

In view of such problems as mentioned in conjunction with the prior art, the present invention has been accomplished to achieve any one of the following objects.

One object of the invention is to provide an image pickup system with an electronic view finder mounted thereon, which is suitable for achieving compactness.

Another object of the invention is to provide an image pickup system that allows viewers to have an easy grasp of an image pickup range.

Yet another object of the invention is to provide an image pickup system that ensures a sufficient viewing angle of field and satisfactory optical performance even when used with an image display device having a short diagonal length of its display surface.

Still yet another object of the invention is to provide an image pickup system having an electronic view finder well corrected for chromatic aberration of magnification.

A further object of the invention is to provide an image pickup system having an electronic view finder, where dust, etc., if deposited on a viewing optical system, are virtually unnoticeable, A further object of the invention is to provide an image pickup system with an electronic view finder mounted thereon, which enables optical elements to be appropriately located even when a reflection type image display device is used as an image display device.

A further object of the invention is to provide an image pickup system having an electronic view finder capable of accomplishing a plurality of such objects as mentioned above.

According to the first aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said viewing optical system comprises at least three lens elements, at least two of which are cemented together to form a doublet component.

An account is now given of what is achieved by the first image pickup system.

To achieve the necessary angle of field (of, e.g., 22°) at the diagonal length of the display screen of an image display device in a conventional image pickup system, an eyepiece magnification of around 7 would be plenty good enough. However, to obtain a sufficient angle of field in the case where a smaller image pickup device is used, too, it is required for a viewing optical system to have a higher eyepiece magnification than a conventional one. To ensure a sufficient angle of field and satisfactory optical performance even when such a smaller image display device is used, therefore, it is required to use at least three lenses for the viewing optical system. This then enables the number of refracting surfaces to be so increased that any sharp refraction by refracting surfaces can be prevented, resulting in a sensible tradeoff between correction of aberrations and ensuring the necessary angle of field.

A lens arrangement consisting of two positive lenses and one negative lens or three lenses in all is more preferable in consideration of cost, because chromatic aberrations and other aberrations can be corrected with a reduced number of lenses.

The doublet component is not only effective for correction of chromatic aberrations but can also have a larger thickness as compared with a lens arrangement comprising separate single lenses. It is thus possible to reduce lens tilt errors on assembly. It is here noted that when the image pickup optical system used is of an interchangeable type, the present invention also includes an image pickup system proper alone.

According to the second aspect of the invention, the image pickup system of the first aspect is further characterized in that said viewing optical system comprises two positive lens elements and one negative lens element.

What is achieved by the second image pickup system is now explained.

With the positive lenses and negative lens incorporated in the viewing optical system, it is possible to make correction for a variety of aberrations inclusive of chromatic aberration of magnification. With the use of at least two positive lenses, positive power can be dispersed throughout the viewing optical system so that spherical aberrations liable to occur with increasing magnification can be well corrected.

According to the third aspect of the invention, the image pickup system of the second aspect is further characterized in that one of said at least two positive lens elements is cemented together with said one negative lens element to form said doublet component.

What is achieved by the third image pickup system is now explained.

Chromatic aberration of magnification likely to occur when the magnification of the viewing optical system becomes high can be well corrected with the doublet.

According to the fourth aspect of the invention, the image pickup system of the third aspect is further characterized in that at least one lens element different from said doublet component in said viewing optical system is a lens element having an aspheric surface.

What is achieved by the fourth image pickup system is now explained.

When an aspheric lens is used in a doublet, it is required to meet both cementing precision and aspheric precision. However, if an aspheric surface is used for one single lens, it is then possible to improve yield with cost reductions. It is here noted that the action of positive power becomes strong at the marginal region of the doublet. By using the aspheric surface at the surface spaced away form the doublet, it is thus possible to make well-balanced correction for axial to off-axis aberrations occurring at the doublet.

According to the fifth aspect of the invention, the image pickup system of the fourth aspect is further characterized in that said lens element having an aspheric surface is a plastic lens element.

An account is now given of what is achieved by the fifth image pickup system.

By forming the lens with an aspheric surface using a plastic material, it is possible to improve processability.

According to the sixth aspect of the invention, the image pickup system of the second aspect is further characterized in that at least one of said two positive elements is a lens element having an aspheric surface.

What is achieved with the sixth image pickup system of the invention is now explained.

It is preferable to use the aspheric surface in the positive lens, because cost reductions are achieved.

According to the seventh aspect of the invention, the image pickup system of the firth aspect is further characterized in that said viewing optical system has an aspheric lens surface.

An account is now given of what is achieved by the seventh image pickup system of the invention.

As the magnification of the viewing optical system becomes high, off-axis aberrations are likely to occur. By the incorporation of an aspheric surface, however, it is possible to make well-balanced correction for axial to off-axis aberrations.

According to the eighth aspect of the invention, the image pickup system of the first aspect is further characterized in that said viewing optical system consists of two lens components or a doublet component composed of one negative lens element and one positive lens element and one single-lens component whose absolute value for refracting power is smaller than either one of the absolute value for refracting power of said positive lens element and the absolute value for refracting power of said negative lens element.

According to the ninth aspect of the invention, the image pickup system of the first aspect is further characterized in that said viewing optical system comprises a single-lens element having an aspheric surface.

Reference is here made to what is achieved by the eighth and ninth image pickup systems of the invention.

Main power for the viewing optical system is allocated to the doublet so that aberrations from axial to off-axis ones are well balanced by the single lens. This single lens, because its optical power can be reduced, also makes it easy to form an aspheric surface thereon, so that a reasonable tradeoff can be made between the number of lenses and correction of aberrations as well as processability.

According to the tenth aspect of the invention, the image pickup system of the ninth aspect is further characterized in that said single-lens component has positive refracting power.

Reference is now made to what is achieved by the tenth image pickup system of the invention.

By using the single lens in the form of a positive lens, it is further possible to make satisfactory correction for spherical aberrations, etc. likely to occur at a viewing optical system of high magnification.

According to the eleventh aspect of the invention, there is provided an image pickup system of the first aspect, characterized in that said viewing optical system consists of three lens elements or, in order from said image display device side, a positive lens element, a negative lens element and a positive lens element, while the first-mentioned positive lens element is cemented together with said negative lens element.

An account is now given of what is achieved by the 11th image pickup system.

Power is almost symmetrically allocated in +−+ order from the display device side, so that a variety of aberrations inclusive of spherical aberrations can be well corrected. A cemented surface for correction of chromatic aberration of magnification can be defined by cementing the positive lens on the display device side together with the negative lens.

Further, main power is allocated on the display device side by locating the doublet on the display device side, so that the display device is located far away from the viewing optical system. This keeps diopter with respect to dust, etc. deposited on the viewing optical system remote from diopter with respect to the display screen, eliminating the inconvenience due to dust.

Furthermore, it is easy to save space for the provision of a reflecting surface for guiding to the display screen the illumination light that is necessary when a reflection type image display device is used as the image display device.

According to the twelfth aspect of the invention, the image pickup system of the first aspect is further characterized in that said viewing optical system consists of three lenses or, in order from said image display device side, a positive lens element, a positive lens element and a negative lens element, while the second-mentioned positive lens element and said negative lens element are cemented together.

What is achieved by the 12th image pickup system is now explained.

The principal point is shifted by allocating power in ++− order from the display device side, so that the display device is located far away from the viewing optical system. This keeps diopter with respect to dust, etc. deposited on the viewing optical system remote from diopter with respect to the display screen, eliminating the inconvenience due to dust.

Further, a cemented surface for correction of chromatic aberration of magnification is defined by cementing together the positive lens on the viewer side and the negative lens.

Furthermore, it is easy to save space for the provision of a reflecting surface for guiding to the display screen the illumination light that is necessary when a reflection type image display device is used as the image display device.

According to the thirteenth aspect of the invention, the image pickup system of any one of the 1st, 8th, 9th, 11th and 12th aspects is further characterized by satisfying the following condition (1):

$$1.0 < b/a \tag{1}$$

Here the small letter $\underline{a}$ is a distance from the display screen of the image pickup device to the surface, nearest to the image display device side, of the viewing optical system, and the small letter $\underline{b}$ is a total length from the surface, axially nearest to the image display device side, of the viewing optical system to the surface thereof nearest to the viewer side.

What is achieved by the 13th aspect of the invention is now described.

Condition (1) is provided to balance the distance from the display screen to the viewing optical system with the total length of the viewing optical system. To obtain a large angle of field with a image display device of small size, it is required to keep the focal length of the viewing optical system short. However, as the lower limit of 1.0 to condition (1) is not reached or the total length of the viewing optical system becomes short, it is required to increase the angle of refraction of axial and off-axis light rays through the viewing optical system, resulting in spherical aberrations, coma, chromatic aberration of magnification, etc. being likely to occur. Otherwise, the distance from the display screen to the viewing optical system becomes too long to obtain the necessary angle of field. To reduce the whole size of the electronic view finder, it is preferable to meet the following condition (1-1):

$$1.0 < b/a < 3.5 \tag{1-1}$$

The same as mentioned-above goes true for the lower limit of 1.0 to this condition (1-1). As the upper limit of 3.5 is exceeded, it is difficult to achieve compactness even when a smaller image display device is used, because the total length of the viewing optical system becomes too long. Otherwise, the spacing between the display screen and the viewing optical system becomes short; dust deposited on the viewing optical system is more noticeable. In addition, it is difficult to take an optical path for guiding illumination light when a reflection type image display device is used as the image display device.

More preferably, the following condition (1-2) should be satisfied:

$$1.5 < b/a < 3.0 \tag{1-2}$$

According to the fourteenth aspect of the invention, the image pickup system of any one of the 1st, 8th, 9th, 11th and 12th aspects is further characterized by satisfying the following condition (2):

$$1.0 < a/c \tag{2}$$

Here the small letter $\underline{a}$ is the distance from the display screen of the image pickup device to the surface, nearest to the image display device side, of the viewing optical system, and the small letter $\underline{c}$ is a length of the short side of the display screen of the image display device.

What is achieved by the 14th image pickup system is now referred to.

Condition (2) is provided to define the length from the display screen to the viewing optical system with respect to the length of the short side of the display screen. As the lower limit of 1.0 to condition (2) is not reached, dust deposited on the viewing optical system is more noticeable. In addition, when a reflection type image display device is used, it is impossible to take any reflection optical path for guiding illumination light thereto.

To reduce the whole size of the electronic view finder, it is preferable to meet the following condition (2-1):

$$1.0 < a/c < 4.5 \tag{2-1}$$

The same as set forth above holds for the lower limit of 1.0 to this condition (2-1). As the upper limit of 4.5 is exceeded, any compactness is never achievable even with a smaller image display device, because the spacing between the image display device and the viewing optical system becomes too large.

More preferably, the following condition should be satisfied:

$$2.0 < a/c < 4.0 \tag{2-2}$$

According to the fifteenth aspect of the invention, the image pickup system of any one of the 1st, 8th, 9th, 11th and 12th aspects is further characterized by satisfying the following condition (3):

$$1.4 < f_e/a < 2.4 \tag{3}$$

Here the small letter $\underline{a}$ is the distance from the display screen of the image pickup device to the surface, nearest to the image display device side, of the viewing optical system, and $f_e$ is a focal length of the viewing optical system.

What is achieved by the 15th image pickup system is now described.

Condition (3) is provided for the sufficient spacing between the display device and the viewing optical system as well as for the necessary eye relief. As the lower limit of 1.4 is not reached, it is difficult to take the eye relief necessary for observation. As the upper limit of 2.4 is exceeded, on the other hand, it is difficult to take any angle of field plenty enough for observation.

More preferably, the following condition (3-1) should be met:

$$1.6 < f_e/a < 2.5 \tag{3-1}$$

According to the sixteenth aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said viewing optical system comprises at least three lens elements, and the following conditions (1) and (3) are satisfied:

$$1.0 < b/a \qquad (1)$$

$$1.4 \leq f_e/a < 2.4 \qquad (3)$$

Here the small letter a is a distance from the display screen of the image pickup device to the surface, nearest to the image display device side, of the viewing optical system, the small letter b is a total length from the surface, axially nearest to the image display device side, of the viewing optical system to the surface thereof nearest to the viewer side, and $f_e$ is a focal length of the viewing optical system.

Referring to what is achieved by the 16th image pickup system of the invention, the actions obtained by meeting condition (1) for the 3rd image pickup system and condition (3) for the 15th image pickup system are attained in addition to those of the 1st image pickup system.

Thus, condition (1) is provided to balance the distance from the display screen to the viewing optical system with the total length of the viewing optical system. To obtain a large angle of field with a compact image display device, it is required to keep the focal length of the viewing optical system short. However, as the lower limit of 1.0 to condition (1) is not reached or the total length of the viewing optical system becomes short, it is required to increase the angle of refraction of axial and off-axis light rays through the viewing optical system, resulting in spherical aberrations, coma, chromatic aberration of magnification, etc. being likely to occur. Otherwise, the distance from the display screen to the viewing optical system becomes too long to obtain the necessary angle of field. To reduce the whole size of the electronic view finder, it is preferable to meet the following condition (1-1):

$$1.0 < b/a < 3.5 \qquad (1-1)$$

The same as mentioned above goes true for the lower limit of 1.0 to this condition (1-1). As the upper limit of 3.5 is exceeded, it is difficult to achieve compactness even when a more compact image display device is used, because the total length of the viewing optical system becomes too long. Otherwise, the spacing between the display screen and the viewing optical system becomes short; dust deposited on the viewing optical system is more noticeable. In addition, it is difficult to take an optical path for guiding illumination light when a reflection type image display device is used as the image display device.

More preferably, the following condition (1-2) should be satisfied:

$$1.5 < b/a < 3.0 \qquad (1-2)$$

Condition (3) is provided for the sufficient spacing between the display device and the viewing optical system as well as for the necessary eye relief. As the lower limit of 1.4 is not reached, it is difficult to take the eye relief necessary for observation. As the upper limit of 2.4 is exceeded, on the other hand, it is difficult to take any angle of field plenty enough for observation.

More preferably, the following condition (3-1) should be met:

$$1.6 < f_e/a < 2.5 \qquad (3-1)$$

According to the seventeenth aspect of the invention, the image pickup system of the 16th aspect is further characterized in that said viewing optical system comprises two positive lens elements and one negative lens element.

No account is given of what is achieved by the 17th image pickup system because the same as referred to in conjunction with the 2nd image pickup system is achieved.

According to the eighteenth aspect of the invention, the image pickup system of the 16th aspect is further characterized in that said viewing optical system has an aspheric lens surface.

No account is given of what is achieved by the 18th image pickup system because the same as referred to in conjunction with the 7th image pickup system is achieved.

According to the nineteenth aspect of the invention, the image pickup system of the 18th aspect is further characterized in that said lens element having an aspheric surface is a plastic lens element.

No account is given of what is achieved by the 19th image pickup system because the same as referred to in conjunction with the 5th image pickup system is achieved.

According to the 20th aspect of the invention, the 16th image pickup system is further characterized in that said viewing optical system consists of two lens components or a doublet component composed of one negative lens element and one positive lens element and one single-lens component whose absolute value for refracting power is smaller than either one of the absolute value for refracting power of said positive lens element and the absolute value for refracting power of said negative lens element.

No account is given of what is achieved by the 20th image pickup system because the same as set forth in conjunction with the 8th image pickup system is achieved.

According to the 21st aspect of the invention, the 16th image pickup system is further characterized in that said viewing optical system comprises a single-lens component having an aspheric surface.

No account is given of what is achieved by the 21st image pickup system because the same as set forth in conjunction with the 9th image pickup system is achieved.

According to the 22nd aspect of the invention, the 16th image pickup system is further characterized in that said viewing optical system consists of three lens elements or, in order from said image display device side, a positive lens element, a negative lens element and a positive lens element, while the first-mentioned positive lens element is cemented together with said negative lens element.

No account is given of what is achieved by the 22nd image pickup system because the same as set forth in conjunction with the 11th image pickup system is achieved.

According to the 23rd aspect of the invention, the 16th image pickup system is further characterized in that said viewing optical system consists of three lenses or, in order from said image display device side, a positive lens element, a positive lens element and a negative lens element, while the first-mentioned positive lens element and said negative lens element are cemented together.

No account is given of what is achieved by the 23rd image pickup system because the same as set forth in conjunction with the 12th image pickup system is achieved.

According to the 24th aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said viewing optical system consists of, in order from said image pickup device side, a negative single-lens component composed of one negative lens element and a positive single-lens component composed of one positive lens element, and the following condition (1)' is satisfied:

$$0.6 < b/a \qquad (1)'$$

Here the small letter a is a distance from the display screen of the image pickup device to the surface, nearest to the image display device side, of the viewing optical system, and the small letter b is a total length from the surface, axially nearest to the image display device side, of the viewing optical system to the surface thereof nearest to the viewer side.

What is achieved by the 24th image pickup system is now explained.

To obtain a sufficient angle of field, the viewing optical system must have a higher eyepiece magnification than a conventional one even when an image pickup device of small size is used. To ensure a sufficient angle of field with two lenses even when an image pickup system of small size is used, therefore, the viewing optical system must be composed of, in order from the image pickup device, a negative single lens and, a positive single lens. As a result, it is possible to spread out light rays with the negative single lens and guide the light rays to a viewer's eyeball through the positive single lens, thereby securing the necessary angle of field.

When the viewing optical system is constructed of two lenses, the lens surface is spaced away from the image plane. This is preferable for preventing an image being observed from becoming worse due to the deposition of dust. For this reason, condition (1)' is broader than condition (1). As the lower limit of 0.6 to condition (1)' is not reached or the whole length of the viewing optical system becomes short, it is required to increase the angle of refraction of axial and off-axis light rays through the viewing optical system, resulting in aberrations such as spherical aberrations, coma and chromatic aberration of magnification being likely to occur. Otherwise, the distance from the display screen to the viewing optical system becomes too long to obtain the necessary angle of field. As a matter of course, the lower limit to this condition (1)' may be set at 1.0 as in the case of condition (1). To reduce the whole size of the electronic view finder, it is preferable to meet the following condition (1-1):

$$1.0 < b/a < 3.5 \qquad (1-1)$$

The same as mentioned above goes true for the lower limit of 1.0 to this condition (1-1). As the upper limit of 3.5 is exceeded, it is difficult to achieve compactness even when a more compact image display device is used, because the total length of the viewing optical system becomes too long. Otherwise, the spacing between the display screen and the viewing optical system becomes short; dust deposited on the viewing optical system is more noticeable. In addition, it is difficult to take an optical path for guiding illumination light when a reflection type image display device is used as the image display device.

More preferably, the following condition (1-2) should be satisfied:

$$1.5 < b/a < 3.0 \qquad (1-2)$$

According to the 25th aspect of the invention, the 24th image pickup system is further characterized by satisfying the following condition (2):

$$1.0 < a/c \qquad (2)$$

Here the small letter a is the distance from the display screen of the image pickup device to the surface, nearest to the image display device side, of the viewing optical system, and the small letter c is a length of the short side of the display screen of the image display device.

What is achieved by the 25th image pickup system is now referred to.

Condition (2) is provided to define the length from the display screen to the viewing optical system with respect to the length of the short side of the display screen. As the lower limit of 1.0 to condition (2) is not reached, dust deposited on the viewing optical system is more noticeable. In addition, when a reflection type image display device is used, it is impossible to take any reflection optical path for guiding illumination light thereto.

To reduce the whole size of the electronic view finder, it is preferable to meet the following condition (2-1):

$$1.0 < a/c < 4.5 \qquad (2-1)$$

The same as set forth above holds for the lower limit of 1.0 to this condition (2-1). As the upper limit of 4.5 is exceeded, any compactness is never achievable even with a more compact image display device, because the spacing between the image display device and the viewing optical system becomes too large.

More preferably, the following condition (2-2) should be satisfied:

$$2.0 < a/c < 4.0 \qquad (2-2)$$

According to the 26th aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said viewing optical system consists of, in order from said image pickup device side, a negative single-lens component composed of one negative lens element and a positive single-lens component composed of one positive lens element, said negative lens element is a double-concave lens element, said positive lens element is a double-convex lens element, of said negative lens element and said positive lens element, only said positive lens element has an aspheric surface, a light beam from said image display device is guided by refraction alone to said viewer's eye, and the following condition (2) is satisfied:

$$1.0 < a/c \qquad (2)$$

Here the small letter a is a distance from the display screen of the image pickup device to the surface, nearest to the image display device side, of the viewing optical system, and the small letter c is a length of the short side of the display screen of the image display device.

What is achieved by the 26th image pickup system is now explained.

To obtain a sufficient angle of field, the viewing optical system must have a higher eyepiece magnification than a conventional viewing optical system even when an image pickup device of small size is used. To ensure a sufficient angle of field with two lenses even when an image pickup system of small size is used, therefore, the viewing optical system must be composed of, in order from the image pickup device, a negative single lens and a positive single lens. As a result, it is possible to spread out light rays with the negative single lens and guide the light rays to a viewer's eyeball through the positive single lens, thereby securing the necessary angle of field.

Condition (2) is provided to define the length from the display screen to the viewing optical system with respect to the length of the short side of the display screen. As the lower limit of 1.0 to condition (2) is not reached, dust deposited on the viewing optical system is more noticeable. In addition, when a reflection type image display device is used, it is impossible to take any reflection optical path for guiding illumination light thereto.

To reduce the whole size of the electronic view finder, it is preferable to meet the following condition (2-1):

$$1.0 < a/c < 4.5 \quad (2\text{-}1)$$

The same as set forth above holds for the lower limit of 1.0 to this condition (2-1). As the upper limit of 4.5 is exceeded, any compactness is never achievable even with a more compact image display device, because the spacing between the image display device and the viewing optical system becomes too large.

More preferably, the following condition (2-2) should be satisfied:

$$2.0 < a/c < 4.0 \quad (2\text{-}2)$$

Especially for correction of aberrations, it is preferable to use a double-concave lens for the negative single lens and a double-convex lens for the positive single lens, because the refracting power loaded on each lens can be allocated to both surfaces of each lens. In addition, as the light beam from the image display device is designed to be guided by refraction alone to the viewer's eyeball, the image under observation is lesser likely to become worse as compared with the provision of a reflecting surface, because of no tilt due to the reflecting surface.

According to the 27th aspect of the invention, the 26th image pickup system is further characterized by satisfying the following condition (1):

$$1.0 < b/a \quad (1)$$

Here the small letter a is a distance from the display screen of the image pickup device to the surface, nearest to the image display device side, of the viewing optical system, and the small letter b is a total length from the surface, axially nearest to the image display device side, of the viewing optical system to the surface nearest to the viewer side.

No account is given of what is achieved by the 27th image pickup system because the same as set forth in conjunction with the 13th image pickup system.

According to the 28th aspect of the invention, the 24th, 25th, 26th or 27th image pickup system is further characterized by satisfying the following condition (3):

$$1.4 < f_e/a < 2.4 \quad (3)$$

Here the small letter a is the distance from the display screen of the image pickup device to the surface, nearest to the image display device side, of the viewing optical system, and $f_e$ is the focal length of the viewing optical system.

No account is given of what is achieved by the 28th image pickup system because the same as set forth in conjunction with the 15th image pickup system is achieved.

According to the 29th aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said image display device has a display screen with a diagonal length in the range of 2.5 mm to 8 mm.

What is achieved by the 29th image pickup system is now explained.

Preferably in this aspect, the image display device should have a display screen with a diagonal length in the range of 2.5 mm to 8 mm. As the lower limit of 2.5 mm is not reached, any angle of field necessary for observation is hardly obtained. As the upper limit of 8 mm is exceeded, the effect on reductions in the whole size of the electronic view finder becomes slender.

According to the 30th aspect of the invention, the 29th image pickup system is further characterized in that said viewing optical system comprises at least a lens element or at most three lens elements.

An account is given of what is achieved by the 30th image pickup system.

The incorporation of at least a lens element enables the viewing optical system to work through at least two refracting surfaces. The incorporation of at most three lens elements, on the other hand, keeps the viewing optical system from being composed of lenses more than required, resulting is some significant cost reductions. In addition, the incorporation of three lens elements in the viewing optical system is preferable for correction of aberrations. To meet both requirements for cost and correction of aberrations, the viewing optical system should preferably be constructed of three lens elements.

According to the 31st aspect of the invention, the 29th image pickup system is further characterized in that the angle of field in a diagonal direction of an image being observed through said viewing optical system is in the range of 15° to 30°.

What is achieved by the 31st image pickup system is now explained.

The angle of field in the diagonal direction of the image being observed through the viewing optical system should be in the range of 15° to 30°. As the lower limit of 15° is not reached, it is difficult to observe images in the image pickup range. As the upper limit of 30° is exceeded, the whole size of the electronic view finder can hardly be reduced.

More preferably, this angle of field should be in the range of 20° to 26°.

According to the 32nd aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said image display device is a reflection type image display device for displaying an image by illumination from a display screen side thereof and comprises an illumination member for illuminating the display screen of said reflection type image display device, and said viewing optical system comprises a plurality of lens elements and further includes at least one aspheric surface.

What is achieved by the 32nd image pickup system is briefly explained.

For observing sharp images, it is more preferable to use a reflection type image display device as the image display device with the viewing optical system comprising a plurality of lens elements and further including at least one aspheric surface, because it is possible to make use of the high aperture efficiency of that reflection type image display device.

According to the 33rd aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said viewing optical system comprises a plurality of lens components in which all surfaces thereof, in contact with air, are convex on an air side, and an angle of field, 2ω, in a diagonal direction of an image being observed through said viewing optical system is at least 22.01°.

According to the 34th aspect of the invention, the 33rd image pickup system is further characterized in that the angle of field, 2ω, in the diagonal direction of the image being observed through said viewing optical system is at least 23.01°.

What is achieved by the 33rd and 34th image pickup systems is now described.

For the viewing optical system it is required to have positive refracting power. Preferably in this case, however, the positive refracting power should be dispersed. By using a plurality of lens components in which all the surfaces thereof, in contact with air, have positive powers, it is thus easy to make the angle of field wide. If the angle of field, 2ω, in the diagonal direction of the image under observation is at least 22.01°, it is then easy to see the image large. In particular, the angle of field of 22.01° makes observation easier.

According to the 35th aspect of the invention, the 1st, 16th, 24th, 26th, 32nd or 33rd image pickup system is further characterized in that a diagonal length of the display screen of said image display device is in the range of 2.5 mm to 8 mm.

No account is given of what is achieved by the 35th image pickup system because the same as set forth in conjunction with the 29th image pickup system is achieved.

According to the 36th aspect of the invention, the 1st, 16th, 24th or 26th image pickup system is further characterized in that the angle of field in the diagonal length of the image being observed through said viewing optical system is in the range of 15° to 30°.

No account is given of what is achieved by the 36th image pickup system because the same as mentioned in conjunction with the 31st image pickup system is achieved.

According to the 37th aspect of the invention, the 1st, 16th, 24th, 26th, 29th or 33rd image pickup system is further characterized in that said image display device is a reflection type image display device for displaying an image by illumination from a display screen side thereof, and comprises an illumination member for illuminating the display screen of said reflection type image display device.

No account is given of what is achieved by the 37th image pickup system because the same as mentioned in conjunction with the 32nd image pickup system is achieved.

According to the 38th aspect of the invention, the 16th, 29th or 32nd image pickup system is further characterized in that said viewing optical system comprises a plurality of lens components in which all surfaces thereof, in contact with air, are convex on an air side.

No account is given of what is achieved by the 38th image pickup system because the same as mentioned in conjunction with the 33rd image pickup system is achieved.

According to the 39th aspect of the invention, the 1st, 16th, 24th, 26th, 29th, 32nd or 33rd image pickup system is further characterized by further comprising a phototaking optical system for guiding a light beam to said image pickup device.

What is achieved by the 39th image pickup system is now explained.

While the present invention has been described on the premise that the phototaking optical system is used, it is understood that the image pickup system proper may be provided with a mount at which replaceable phototaking optical systems are arbitrarily mounted. Such an image pickup system free from any phototaking optical system, too, is included in the image pickup system of the invention.

It is also understood that if an image pickup optical system for guiding a light beam to the image pickup device is used as in the 39th image pickup system, it is then possible to observe a subject's image depending on the properties (angle of view, depth of focus, etc.) of the image pickup optical system.

According to the 40th aspect of the invention, there is provided an image pickup system comprising an image pickup device, an image display device for displaying an image, a controller for converting image formation obtained from said image pickup device into a signal that enables said image information to be formed on said image display device, and a viewing optical system for guiding an image displayed on said display device to a viewer's eye, characterized in that:

said viewing optical system consists of two single-lens elements or, in order from said display device side, a single-lens element in a negative meniscus form convex on said display device side and a positive single-lens element in a double-convex form, and surfaces located from a display screen to a viewer's eyeball are all composed only of refracting surfaces.

What is achieved by the 40th image pickup system is now explained.

With the lens arrangement where the negative single-lens element and the double-convex positive single-lens element are located in order from the display screen side, it is possible to secure a wide field.

Preferably in this case, the negative lens element should be in a meniscus form convex on the display screen side, because the surface of positive power, the surface of negative power and the surface of positive power are arranged in order from the display screen side so that aberrations can be well corrected with a reduced number of lenses.

Furthermore, much more simplified construction is achievable because of no reflection of an optical path from the display screen.

According to the 41st aspect of the invention, the 40th image pickup system is further characterized by satisfying the following condition (3):

$$1.4 < f_e/a < 2.4 \tag{3}$$

Here the small letter $a$ is the distance from the display screen of the image pickup device to the surface, nearest to the image display device side, of the viewing optical system, and $f_e$ is the focal length of the viewing optical system.

No account is given of what is achieved by the 41st image pickup system because the same as mentioned in conjunction with the 15th image pickup system is achieved.

According to the present invention, a plurality of the aforesaid aspects may be used in suitable combinations while the effect of each aspect is kept intact.

Even though only the upper or lower limit to each condition is satisfied, the effect corresponding to that limit may be achievable.

It is also understood that the values referred to in the following examples may be used as the upper or lower limit values.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some embodiments of the image pickup system according to the invention are now explained.

Figure 1:
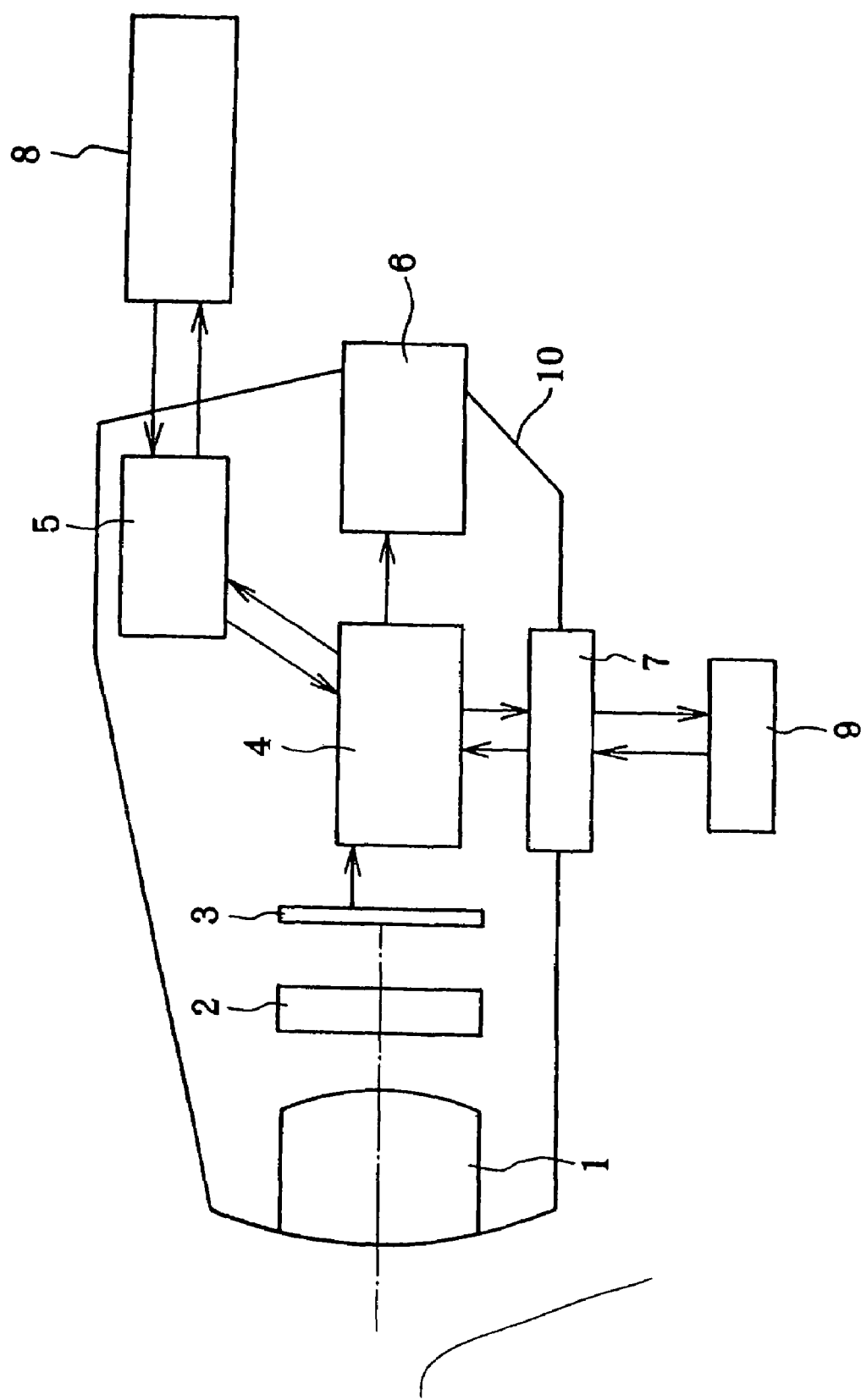
FIG. 1 is illustrative in schematic of the construction of a digital camera that is one embodiment of the image pickup system according to the invention.

FIG. 1 is illustrative of the construction of a digital camera that is one embodiment of the image pickup system according to the invention.

Referring to FIG. 1, reference numeral 10 indicates an image pickup system or a digital camera comprising an image pickup optical system 1, a filter 2, an image pickup device 3, a controller 4, a built-in memory 5, an electronic view finder 6, and an interface 7.

In the aforesaid image pickup system, light emanating from an object point is focused through the image pickup system 1 comprising optical elements (such as lenses) on the light-sensing surface of the image pickup device 3 such as a CCD to form an object image thereon. The image pickup device 3 is an array of regularly arranged photoelectric converters, and between the image pickup system 1 and the image pickup device 3 there is located a filter 2 having a low-pass effect on prevention of a moiré phenomenon due to such an array. In some cases, an infrared cut filter for cutting off infrared light may be located.

A light beam incident on the image pickup device 3 is converted by the photoelectric converters to electric signals which are then inputted into the controller 4, where they are subjected to image processing such as gamma correction and image compression and then sent to a personal computer 9 or the like via the built-in memory 5 and interface 7.

The resultant signals are then transmitted to a reflection type image display device (not shown in FIG. 1), from which they are fed to the electronic view finder 6 comprising an illumination system, a reflection type image display device, a viewing optical system or the like, so that the image to be picked up or the picked up image can be observed by an observer. Image data may be sent from the built-in memory 5 to an auxiliary memory 8, while the same image data may be sent from the interface 7 to the personal computer 9.

Figure 2:
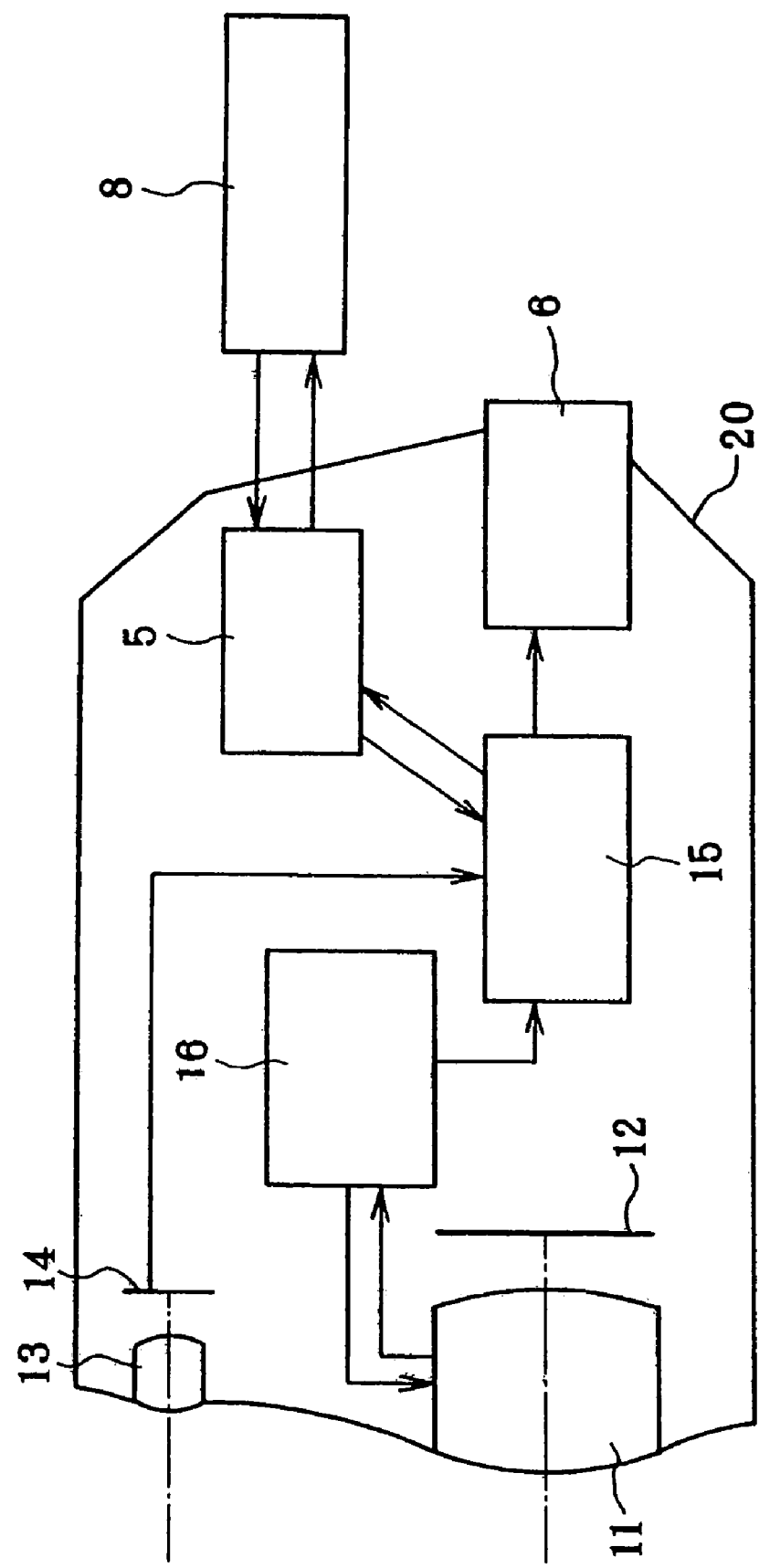
FIG. 2 is illustrative of the construction of a sliver-salt camera to which the image pickup system of the invention is applied.

FIG. 2 is illustrative of the construction of a silver-salt camera to which the image pickup system according to the invention is applied. As shown in FIG. 2, a silver-salt camera 20 comprising the image pickup system of the invention is provided with an image pickup optical system 11, a film 12, an objective lens 13, an image pickup device 14 such as a CCD, a first controller 15 and another or a second controller 16 as well as, as in the case of the FIG. 1 digital camera, a built-in memory 5 and an electronic view finder 6.

In the silver-salt camera 20 shown in FIG. 2, a light beam from an object point is focused through the image pickup optical system 11 on the film 12 to form an object image thereon. A light beam from the object point is also focused through the objective lens 13 separate from the image pickup optical system 11 on the image pickup device 14 such as a CCD to form an object image thereon. The light beam incident on the image pickup device 14 is converted by photoelectric converters forming the image pickup device 14 to electric signals, which are then inputted into the first controller 15, where they are subjected to image processing such as gamma correction and image compression and then sent to a reflection type image display device and fed to the electronic view finder 6 constructed of an illumination system, a reflection type image display device, a viewing optical system, etc., so that the image to be picked up can be observed by an observer.

On the other hand, if information, etc. stored by the controller 15 in the built-in memory 5 are used, it is then possible for the user (observer) to view the picked-up image.

The second controller 16 is provided to control the image pickup optical system 11. On the basis of signals from the second controller 16, the first controller 15 may recognize information on the zooming, focusing, etc. of the image pickup optical system 11, so that adjustments are made depending on the image pickup angle of view of the image to be displayed on the reflection type image display device. Alternatively, the second controller 16 may recognize information on the focusing, etc. of the image pickup optical system 11, so that the range of the image displayed on the reflection type display device is corrected (for parallax). Still alternatively, signals may be sent from the first controller 15 to the built-in memory 5 or an interface (not shown), thereby producing output on a personal computer or the like.

Further, the objective lens 13 may be dispensed with. For instance, a light beam from the image pickup optical system 11 may be split into two or more beams, one of which is used for finder purposes. This finder light beam is used to form an image on the image pickup device 14 such as a CCD for viewing purposes.

Next, the electronic view finder used herein is explained.

Figure 3:
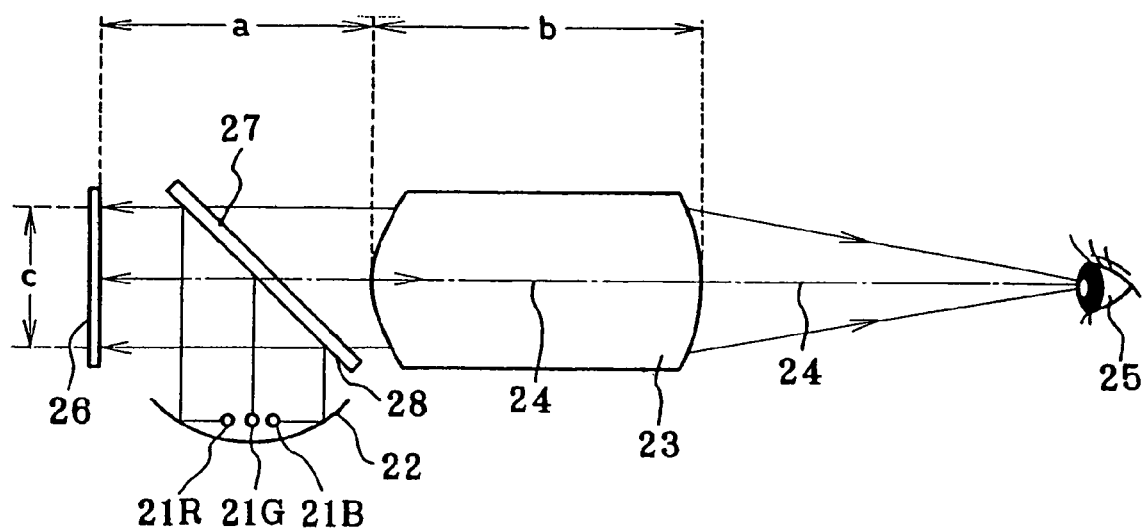
FIG. 3 is illustrative of the construction of a typical electronic view finder according to the invention.

FIG. 3 is illustrative of the construction of a typical electronic view finder used herein. Reference numerals 21R, 21G and 21B represent a red light source, a green light source and a blue light source, respectively. For instance, light-emitting diodes are used. Reference numeral 22 stands for an illumination optical system, 23 a viewing optical system, 24 the optical axis of the viewing optical system 23, 25 a viewer's eye, 26 a reflection type image display device, and 27 a plane-parallel plate with a polarizing half-silvered mirror 28 mounted thereon.

In the thus constructed finder, illumination light from the light sources 21R, 21G and 21B is reflected by the illumination optical system 22 comprising a reflecting mirror in one direction (upwardly in FIG. 3). The optical axis 24 of the viewing optical system 23 is designed to intersect vertically the substantial center of the image display device 26.

Leaving the light sources 21R, 21G and 21B and reflected by the illumination optical system 22 constructed of a reflecting mirror in one direction, illumination light propagates with its center intersecting almost vertically the optical axis 24 of the viewing optical system 23, and is then reflected at the half-silvered mirror 28 toward the reflection type image display device 26.

The reflection type image display device 26 used is a reflection type twisted nematic liquid crystal display device with its twist angle set at 45°.

An image displayed on this reflection type display device 26 is viewed by an observer via the viewing optical system 23 through the plane-parallel plate 27 with the polarizing half-silvered mirror 28 mounted thereon.

In the electronic view finder of such construction, when the illumination light emanating from the light sources 21R, 21B and 21G is in a randomly polarized state, it is linearly polarized by the polarizing half-silvered mirror 28 in a certain direction for illuminating the liquid crystal display device 26. For instance, when the polarizing half-silvered mirror 28 is designed in such a way as to reflect S waves and transmit P waves, the illumination light reflected at the half-silvered mirror 28 is defined by S waves. Reflected at the half-silvered mirror 28 to illuminate the liquid crystal display device 26 that is an image display device, the illumination light passes through voltage-applied pixels and a liquid crystal layer, at the bottom of which it is reflected, leaving with the polarizing direction turned through 90°. Thus, the illumination light, which has been entered as S waves into the image pickup display device 26 and modulated thereat, leaves in the form of P waves. Upon re-incidence on the plane plate 27, nearly all this P-wave light transmits through the polarizing half-silvered mirror 28, arriving at a viewer's eye 25 via the viewing optical system 23.

The light sources 21R, 21G and 21B are put on in order, so that red, green and blue light rays are successively guided to the liquid crystal display device 26. In turn, the liquid crystal display device 26 displays successively images corresponding to the thus guided light rays, so that color images are formed.

As mentioned above, the electronic view finder used herein can be a compact, light-weight finder that is simplified in construction, and makes effective use of light, because of no substantial losses in the quantity of light emanating from the light sources 21R, 21G and 21B. The action of the viewing optical system 23 enables the observer to perceive images on the image display device 26 as virtual images on an enlarged scale. Preferably in this case, the electronic view finder should be designed such that an illumination optical path where light beams leaving the light sources 21R, 21G and 21B enter the image display device 26 upon reflection at the polarizing half-silvered mirror 28 and a viewing optical path where light beams reflected at the image display device 26 are guided to the viewer's eye upon transmission through the polarizing half-silvered mirror 28 form a reciprocating optical path between the polarizing half-silvered mirror 28 and the image display device 26. With this arrangement, the optical path through the viewing optical system can be used as a combined forward and backward optical path, so that wasted optical elements (transmitting surfaces or reflecting surfaces) and space can be eliminated unlike an optical system having separate two optical paths, thereby making the image pickup system compact. This arrangement is also helpful for prevention of flare light.

In the finder shown in FIG. 3, it is noted that a curved surface such as a rotationally symmetric paraboloid may be used instead of the half-silvered mirror 28. It is also noted that the illumination optical system 22 may be located at an optical path passing through the half-silvered mirror 28 and the viewing optical system 23 may be positioned at an optical path for reflecting the half-silvered mirror 26. In the case, the distance a from the display screen of the image display device 26 to the surface of the viewing optical system 23 located nearest to the image display device 26 side is understood to mean the length of that optical path.

The viewing optical system 23 in the electronic view finder shown in FIG. 3 may be constructed as in the following examples.

In the following Examples 1 to 5, the display screen is in a rectangular form having a length of 3.84 mm in the horizontal direction and a length of 2.88 mm in the vertical (short-side) direction with a diagonal length of 4.8 mm. In the following Example 6, the display screen is in a rectangular form having a length of 8.96 mm in the horizontal direction and a length of 6.66 mm in the vertical (short-side) direction with a diagonal length of 11.164 mm.

Figure 4A:
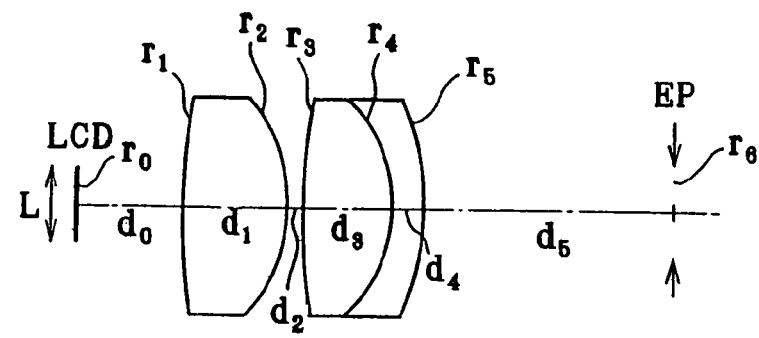
FIGS. 4(a) through 4(d) are sectional views inclusive of the optical axes of the viewing optical systems in Examples 1 to 4 of the invention.
Figure 4B:
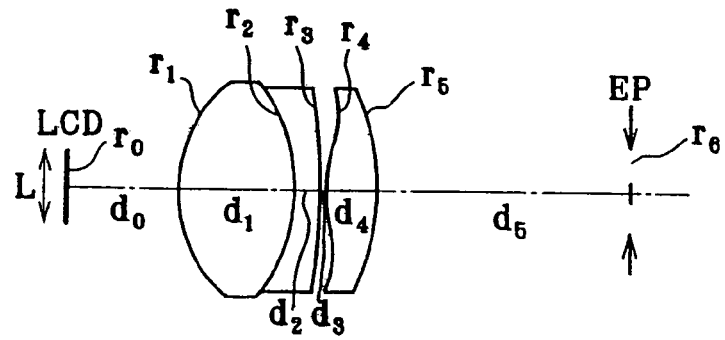
Figure 4C:
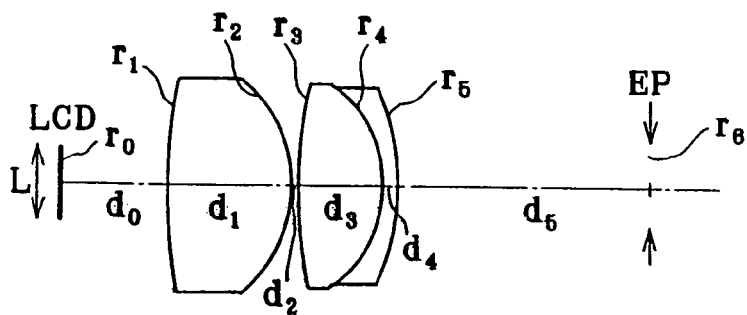
Figure 4D:
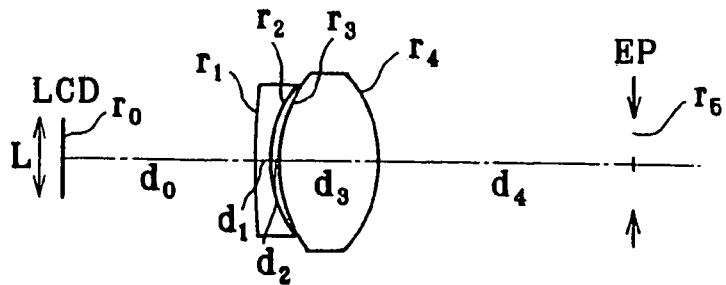
Figure 5A:
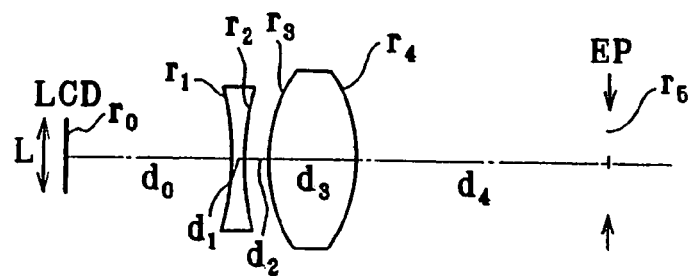
FIGS. 5(a) through 5(c) are sectional views inclusive of the optical axes of the viewing optical systems in Examples 5 to 7 of the invention.
Figure 5B:
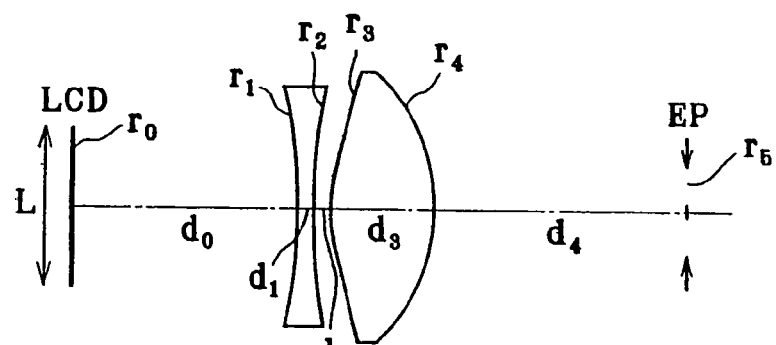
Figure 5C:
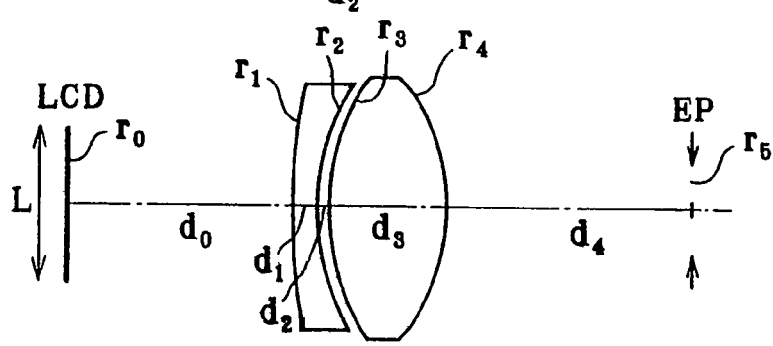
Figure 6:
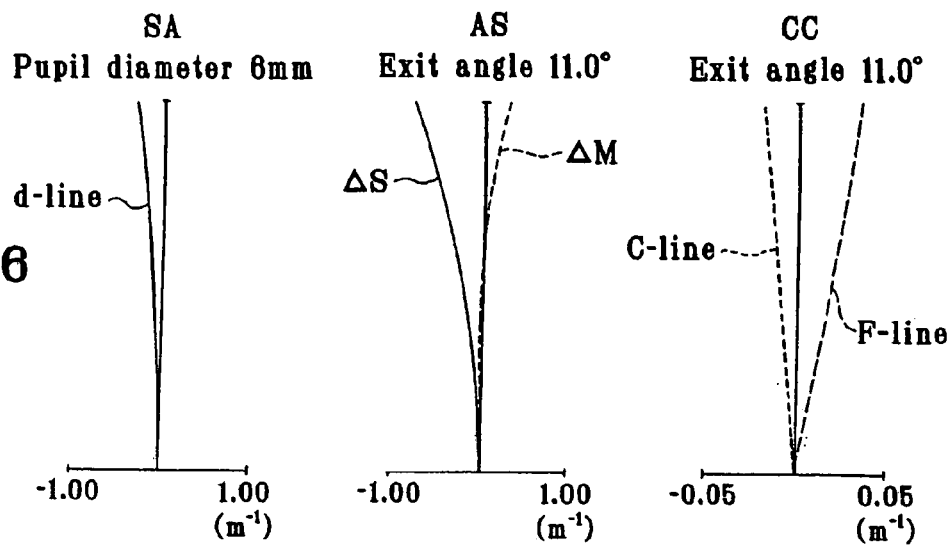
FIG. 6 is an aberration diagram for the viewing optical system of Example 1.
Figure 7:
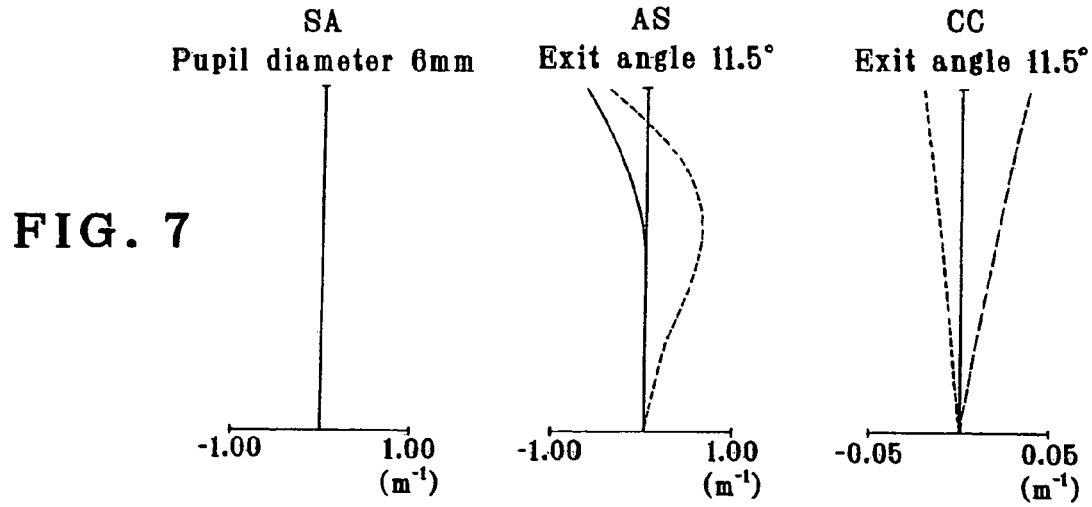
FIG. 7 is an aberration diagram for the viewing optical system of Example 2.
Figure 8:
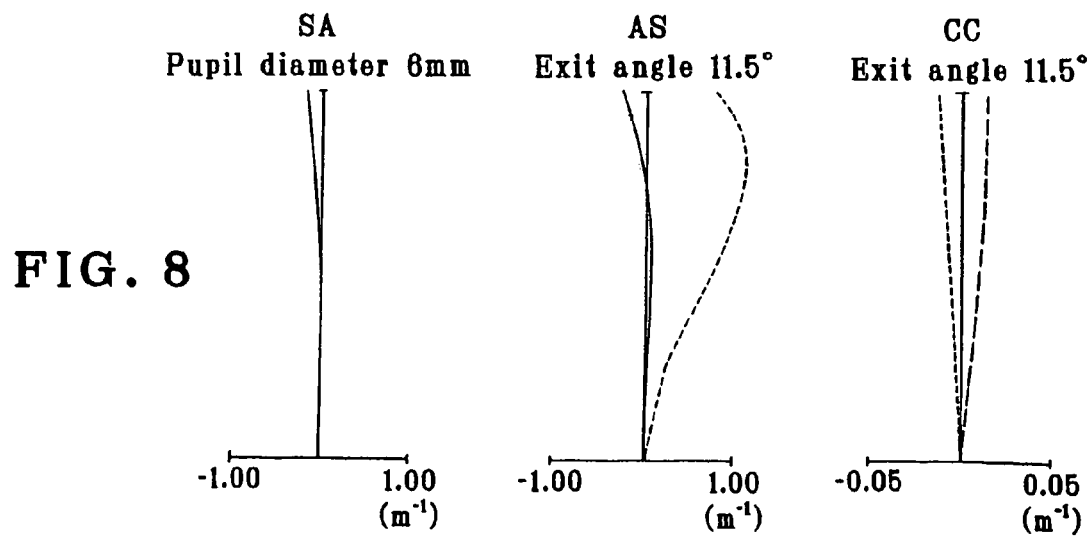
FIG. 8 is an aberration diagram for the viewing optical system of Example 3.
Figure 9:
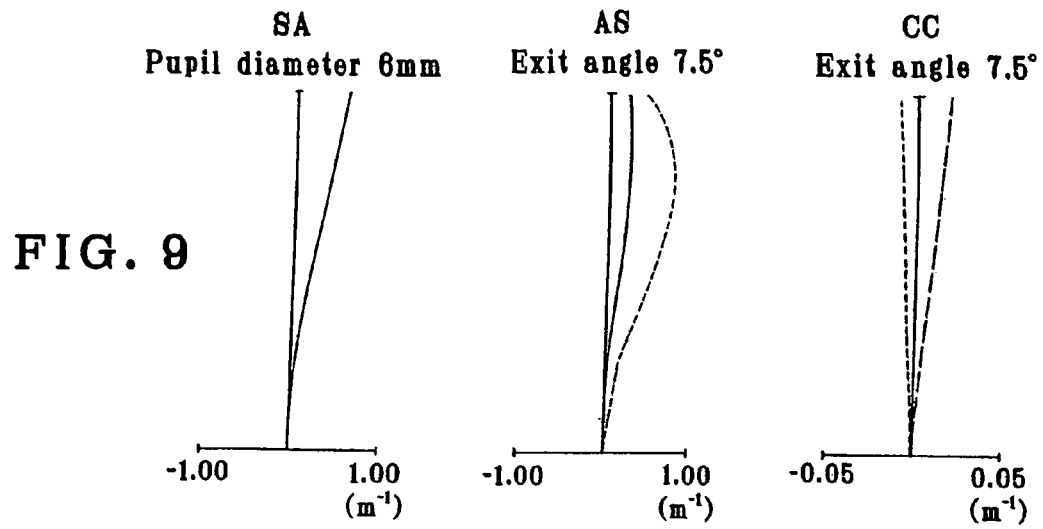
FIG. 9 is an aberration diagram for the viewing optical system of Example 4.
Figure 10:
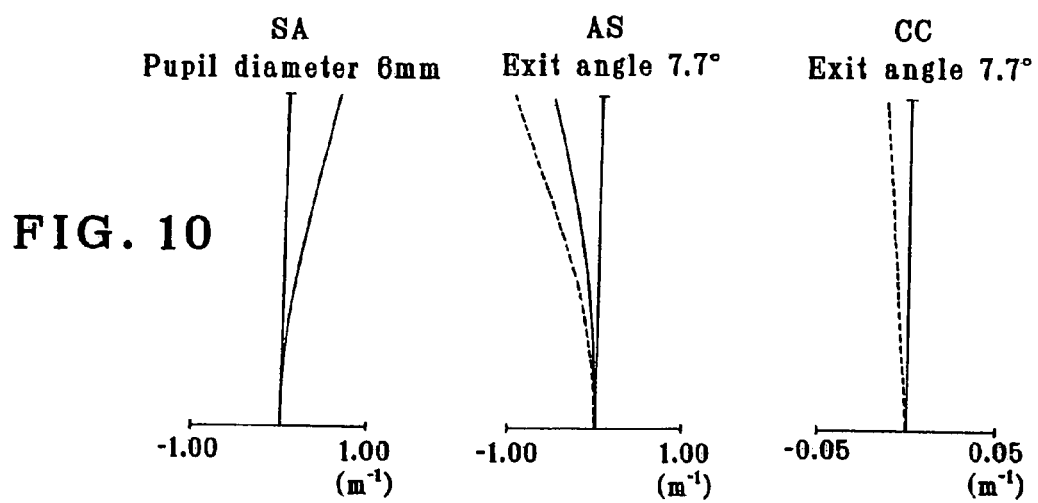
FIG. 10 is an aberration diagram for the viewing optical system of Example 5.
Figure 11:
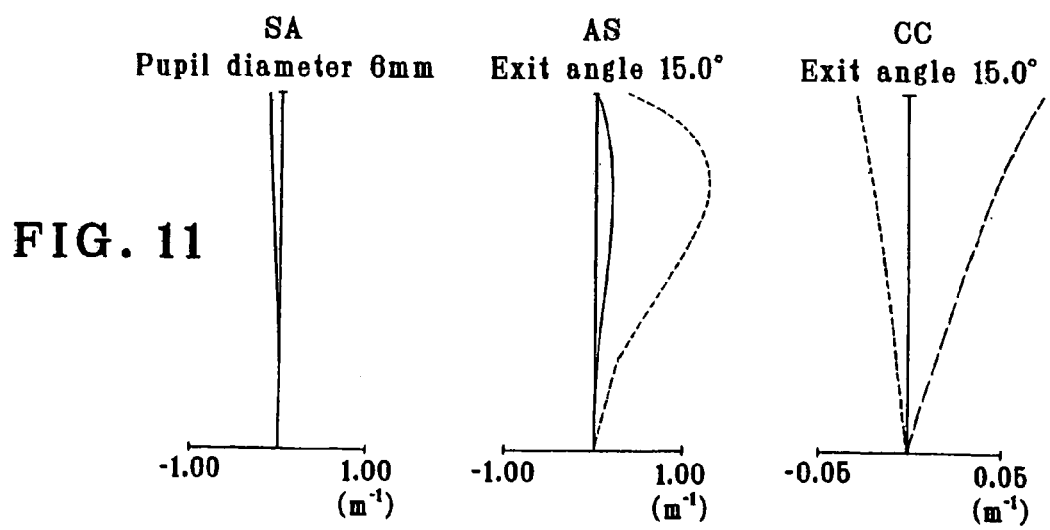
FIG. 11 is an aberration diagram for the viewing optical system of Example 6.
Figure 12:
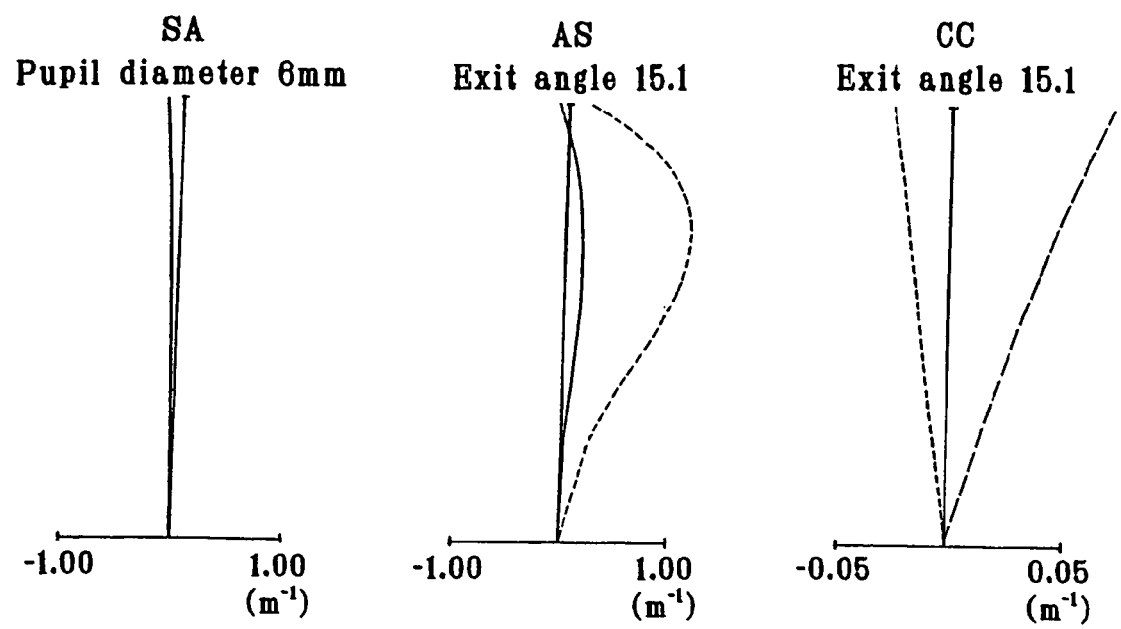
FIG. 12 is an aberration diagram for the viewing optical system of Example 7.

FIGS. 4(a) through 4(d) are sectional views including the optical axes of the viewing optical systems according to Examples 1 to 4, and FIGS. 5(a) through 5(c) are sectional views including the optical axes of the viewing optical systems according to Examples 5 to 7. Numerical data on these examples will be enumerated later. In each example, "LCD" represents a liquid crystal display device forming part of the image display device, "EP" an eye point", and "L" the diagonal length of the image display device.

As shown in FIG. 4(a), the viewing optical system of Example 1 is composed of, in order from the image display device side, a double-convex positive lens and a doublet consisting of a double-convex positive lens and a negative meniscus lens concave on its object side, while the surface nearest to the eye point side is formed of an aspheric surface.

The values for conditions (1) to (3) in this example and the angle of field, $2\omega$, in the diagonal direction of an image-under observation are as follows:

a=6.59 mm
b=16.06 mm
c=2.88 mm
$f_e$=12.77 mm
b/a=2.435
a/c=2.289
$f_e$/a=1.937
$2\omega$=22.01°

As shown in FIG. 4(b), the viewing optical system of Example 2 is composed of, in order from the display device side, a doublet consisting of a double-convex positive lens and a negative meniscus lens concave on its object side and a double-convex positive lens, while the object side-surface of the double-convex positive lens located on an eye point side is formed of an aspheric surface.

The values for conditions (1) to (3) in this example and the angle of field, 2ω, in the diagonal direction of an image under observation are as follows:
a=7.00 mm
b=13.12 mm
c=2.88 mm
$f_e$=11.97 mm
b/a=1.876
a/c=2.430
$f_e$/a=1.710
2ω=23.01°

As shown in FIG. 4(c), the viewing optical system of Example 3 is composed of, in order from a display device side, a double-convex positive lens and a doublet consisting of a double-convex positive lens and a negative meniscus lens concave on its object side, while the surface, on an eye point side, of the double-convex positive lens on the object side is formed of an aspheric surface.

The values for conditions (1) to (3) in this example and the angle of field, 2ω, in the diagonal direction of an image under observation are as follows:
a=6.52 mm
b=15.13 mm
c=2.88 mm
$f_e$=12.09 mm
b/a=2.319
a/c=2.265
$f_e$/a=1.853
2ω=23.03°

As shown in FIG. 4(d), the viewing optical system of Example 4 is composed of, in order from a display device side, a negative meniscus lens convex o its object side and a double-convex positive lens while the object-side surface of the double-convex positive lens is formed of an aspheric surface.

The values for conditions (1) to (3) in this example and the angle of field, 2ω, in the diagonal direction of an image under observation are as follows:
a=12.28 mm
b=8.03 mm
c=2.88 mm
$f_e$=18.24 mm
b/a=0.654
a/c=4.266
$f_e$/a=1.485
2ω=15.05°

As shown in FIG. 5(a), the viewing optical system of Example 5 is composed of, in order from a display device side, a double-concave negative lens and a double-convex positive lens, while the eye point-side surface of the double-convex positive lens is formed of an aspheric surface.

The values for conditions (1) to (3) in this example and the angle of field, 2ω, in the diagonal direction of an image under observation are as follows:
a=10.91 mm
b=8.49 mm
c=2.88 mm
$f_e$=18.24 mm
b/a=0.778
a/c=3.789
$f_e$/a=1.671
2ω=15.45°

As shown in FIG. 5(b), the viewing optical system of Example 6 is made up of, in order from a display device side, a double-concave negative lens and a double-convex positive lens while the object-side surface of the double-convex positive lens is formed of an aspheric surface.

The values for conditions (1) to (3) in this example and the angle of field, 2ω, in the diagonal direction of an image under observation are as follows:
a=14.64 mm
b=9.16 mm
c=6.66 mm
$f_e$=21.21 mm
b/a=0.626
a/c=2.198
$f_e$/a=1.448
2ω=30.04°

As shown in FIG. 5(c), the viewing optical system of Example 7 is made up of, in order from a display device side, a negative meniscus lens convex on the display device side and a double-convex positive lens while the object-side surface of the double-convex positive lens is formed of an aspheric surface. In this example, there is used a transmission type liquid crystal display device wherein light sources are located on the back side of a display screen so that an image is formed by light transmitting through the transmission type liquid crystal display device.

The values for conditions (1) to (3) in this example and the angle of field, 2ω, in the diagonal direction of an image under observation are as follows:
a=15.04 mm
b=10.38 mm
c=6.66 mm
$f_e$=21.27 mm
b/a=0.69
a/c=2.26
$f_e$/a=1.41
2ω=30.02°

In what follows, numerical data on each example will be given. It is noted that $r_1$, $r_2$, . . . represent the radius of curvature of each lens surface, $d_1$, $d_2$, . . . represent the spacing between lens surfaces, $n_{d1}$, $n_{d2}$, . . . represent the d-line refractive index of each lens, and $v_{d1}$, $v_{d2}$, . . . represent the Abbe number of each lens. It is also noted that $r_0$ stands for the radius of curvature of the display screen of "LCD", $d_0$ indicates the spacing between the display screen of "LCD" and the first lens surface, $r_6$ in Examples 1-3 and $r_5$ in Examples 4-6 each show the radius of curvature of the "EP" surface, and $d_5$ in Examples 1-3 and $d_4$ in Examples 4-6 each represent an eye relief. Length is given in mm. Here let x stand for an optical path provided that the direction of propagation of light is positive and y indicate a direction perpendicular to the optical axis. Aspheric surface shape is given by $$x=(y^2/r)/[1+\{1-(K+1)(y/r)^2\}^{1/2}]+A_4y^4+A_6y^6+A_8y^8$$

Here r is a paraxial radius of curvature, K is a conical coefficient, and $A_4$, $A_6$ and $A_8$ are the 4th, 6th and 8th aspheric coefficients, respectively.

Example 1

| | | | |
|---|---|---|---|
| $r_0 = \infty$ (LCD) | $d_0 = 6.59$ | | |
| $r_1 = 52.055$ | $d_1 = 6.86$ | $n_{d1} = 1.58913$ | $v_{d1} = 61.14$ |
| $r_2 = -11.570$ | $d_2 = 1.09$ | | |
| $r_3 = 54.042$ | $d_3 = 6.06$ | $n_{d2} = 1.56384$ | $v_{d2} = 60.67$ |
| $r_4 = -9.258$ | $d_4 = 2.05$ | $n_{d3} = 1.80518$ | $v_{d3} = 25.42$ |
| $r_5 = -17.680$ (Aspheric) | $d_5 = 17.00$ | | |
| $r_6 = \infty$ (EP) | | | |

-continued

Aspherical Coefficients
5th surface $K = 0.000$
$A_4 = 1.57513 \times 10^{-5}$
$A_6 = 2.15451 \times 10^{-7}$
$A_8 = -4.32763 \times 10^{-9}$

Example 2

$r_0 = \infty$ (LCD)      $d_0 = 7.00$
$r_1 = 10.449$            $d_1 = 7.54$     $n_{d1} = 1.56384$   $\nu_{d1} = 60.67$
$r_2 = -14.467$           $d_2 = 1.64$     $n_{d2} = 1.80518$   $\nu_{d2} = 25.42$
$r_3 = -114.013$          $d_3 = 0.50$
$r_4 = 20.456$ (Aspheric) $d_4 = 3.45$     $n_{d3} = 1.58913$   $\nu_{d3} = 61.14$
$r_5 = -18.079$           $d_5 = 17.00$
$r_6 = \infty$ (EP)

Aspherical Coefficients
4th surface $K = 0.000$
$A_4 = -3.29162 \times 10^{-4}$
$A_6 = 1.70351 \times 10^{-6}$
$A_8 = -7.06260 \times 10^{-8}$

Example 3

$r_0 = \infty$ (LCD)        $d_0 = 6.52$
$r_1 = 52.055$              $d_1 = 8.25$   $n_{d1} = 1.58913$   $\nu_{d1} = 61.14$
$r_2 = -10.708$ (Aspheric)  $d_2 = 0.30$
$r_3 = 34.600$              $d_3 = 5.78$   $n_{d2} = 1.56384$   $\nu_{d2} = 60.67$
$r_4 = -9.258$              $d_4 = 0.80$   $n_{d3} = 1.80518$   $\nu_{d3} = 25.42$
$r_5 = -23.115$             $d_5 = 17.00$
$r_6 = \infty$ (EP)

Aspherical Coefficients
2nd surface $K = 0.000$
$A_4 = 4.79644 \times 10^{-5}$
$A_6 = -6.80364 \times 10^{-7}$
$A_8 = 5.86617 \times 10^{-9}$

Example 4

$r_0 = \infty$ (LCD)       $d_0 = 12.28$
$r_1 = 50.414$             $d_1 = 1.06$    $n_{d1} = 1.58423$   $\nu_{d1} = 30.49$
$r_2 = 9.124$              $d_2 = 0.55$
$r_3 = 9.908$ (Aspheric)   $d_3 = 6.42$    $n_{d2} = 1.49236$   $\nu_{d2} = 57.86$
$r_4 = -9.014$             $d_4 = 17.00$
$r_5 = \infty$ (EP)

Aspherical Coefficients
3rd surface $K = 0.000$
$A_4 = -4.23266 \times 10^{-4}$
$A_6 = 1.26605 \times 10^{-5}$
$A_8 = -1.87739 \times 10^{-7}$

Example 5

$r_0 = \infty$ (LCD)       $d_0 = 10.91$
$r_1 = -26.234$            $d_1 = 1.06$    $n_{d1} = 1.58423$   $\nu_{d1} = 30.49$
$r_2 = 24.828$             $d_2 = 1.51$
$r_3 = 13.612$             $d_3 = 5.92$    $n_{d2} = 1.49236$   $\nu_{d2} = 57.86$
$r_4 = -8.868$ (Aspheric)  $d_4 = 17.00$
$r_5 = \infty$ (EP)

Aspherical Coefficients
4th surface $K = 0.000$
$A_4 = 2.46412 \times 10^{-4}$
$A_6 = 2.50349 \times 10^{-6}$
$A_8 = 1.52473 \times 10^{-8}$

Example 6

$r_0 = \infty$ (LCD)        $d_0 = 14.64$
$r_1 = -37.022$             $d_1 = 1.02$    $n_{d1} = 1.58423$   $\nu_{d1} = 30.49$
$r_2 = 52.882$              $d_2 = 1.32$
$r_3 = 15.833$ (Aspheric)   $d_3 = 6.82$    $n_{d2} = 1.52542$   $\nu_{d2} = 55.78$
$r_4 = -13.482$             $d_4 = 17.00$
$r_5 = \infty$ (EP)

Aspherical Coefficients
3rd surface $K = 0.000$
$A_4 = -2.24211 \times 10^{-4}$
$A_6 = 6.92370 \times 10^{-7}$
$A_8 = -1.96757 \times 10^{-9}$

Example 7

$r_0 = \infty$ (LCD)        $d_0 = 15.04$
$r_1 = 68.309$              $d_1 = 1.77$    $n_{d1} = 1.58423$   $\nu_{d1} = 30.49$
$r_2 = 17.414$              $d_2 = 0.71$
$r_3 = 13.379$ (Aspheric)   $d_3 = 7.90$    $n_{d2} = 1.52542$   $\nu_{d2} = 55.78$
$r_4 = -15.234$             $d_4 = 17.00$
$r_5 = \infty$ (EP)

Aspherical Coefficients
3rd surface $K = 0.000$
$A_4 = -1.72329 \times 10^{-4}$
$A_6 = 7.59604 \times 10^{-7}$
$A_8 = -5.05665 \times 10^{-9}$ FIGS. 6 to 12 are aberration diagrams for Examples 1 to 7, in which "SA", "AS" and "CC" represent spherical aberrations, astigmatism and chromatic aberration of magnification, respectively.

As can be appreciated from the foregoing, the present invention can provide such image pickup systems as summarized below:

an image pickup system having an electronic view finder suitable for achieving compactness;

an image pickup system that enables an observer to have an easy grasp of the image pickup range;

an image pickup system that gets hold of a sufficient angle of field and satisfactory optical performance even when using an image display device provided with a display screen having a short diagonal length;

an image pickup system having an electronic view finder with well-corrected chromatic aberration of magnification;

an image pickup system provided with an electronic view finder wherein dust, etc. deposited on a viewing optical system are unnoticeable; and an image pickup system provided with an electronic view finder that enables appropriate optical elements to be located even when a reflection type image display device is used as an image display device.

What is claimed is:

1. An image pickup system comprising an image pickup device, an image display device for displaying an image, a controller for converting image information obtained from said image pickup device into a signal that enables said image information to be formed on said image display device, an a viewing optical system for guiding an image displayed on said display device to a viewer's eye, wherein:

said image display device has a display screen with a diagonal length in the range of 2.5 mm to 8 mm, and said viewing optical system comprises a plurality of lens components in which lens surfaces in contact with air all have a convex surface directed toward an air side, and an angle of field, $2\omega$, in a diagonal direction of an observation image observed by said viewing optical system is at least 22.01°.

2. An image pickup system comprising an image pickup device, an image display device for displaying an image, a controller for converting image information obtained from said image pickup device into a signal that enables said image information to be formed on said image display device, and a viewing optical system for guiding an image displayed on said display device to a viewer's eye, wherein:

said image display device has a display screen with a diagonal length in the range of 2.5 mm to 8 mm, and said viewing optical system comprises a plurality of lens components in which all surfaces thereof, in contact with air, are convex on an air side, said viewing optical system comprises at least three lens elements, and wherein the following conditions (1) and (3) are satisfied:

$$1.0 < b/a \quad (1)$$

$$1.4 < f_e/a < 2.4 \quad (3)$$

where a is a distance from the display screen of said image display device to the surface, nearest to the image display device side, of said viewing optical system, b is a total length from the surface, axially nearest to the image display device side, of said viewing optical system to the surface thereof nearest to the viewer side, and $f_e$ is a focal length of said viewing optical system.

3. The image pickup system according to claim 1 or 2, wherein said viewing optical system comprises at least a lens element or at most three lens elements.

4. The image pickup system according to claim 2, wherein an angle of field in a diagonal direction of an image being observed through said viewing optical system is in the range of 15° to 30°.

5. The image pickup system according to claim 1, wherein:

the field angle of $2\omega$ in a diagonal direction of an observation image observed by said viewing optical system is at least 23.01°.

6. The image pickup system according to claim 1 or 2 wherein said image display device is a reflection type image display device for displaying an image by illumination from a display screen side thereof, said image pickup system further comprising an illumination member for illuminating the display screen of said reflection type image display device.

7. The image pickup system according to claim 1 or 2 which further comprises a photo-taking optical system for guiding a light beam to said image pickup device.

8. The image pick-up system according to claim 1 or 2 wherein:

said viewing optical system consists of, in order from a display device side, a single-lens element having a negative meniscus shape with a convex surface directed toward the display device side and a positive single-lens element having a double-convex shape.

* * * * *

UNITED STATES PATENT AND TRADEMARK OFFICE
CERTIFICATE OF CORRECTION

PATENT NO. : 7,605,982 B2 Page 1 of 1
APPLICATION NO. : 11/495531
DATED : October 20, 2009
INVENTOR(S) : Miyauchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Fifth Day of October, 2010

David J. Kappos
*Director of the United States Patent and Trademark Office*